UNITED STATES PATENT OFFICE.

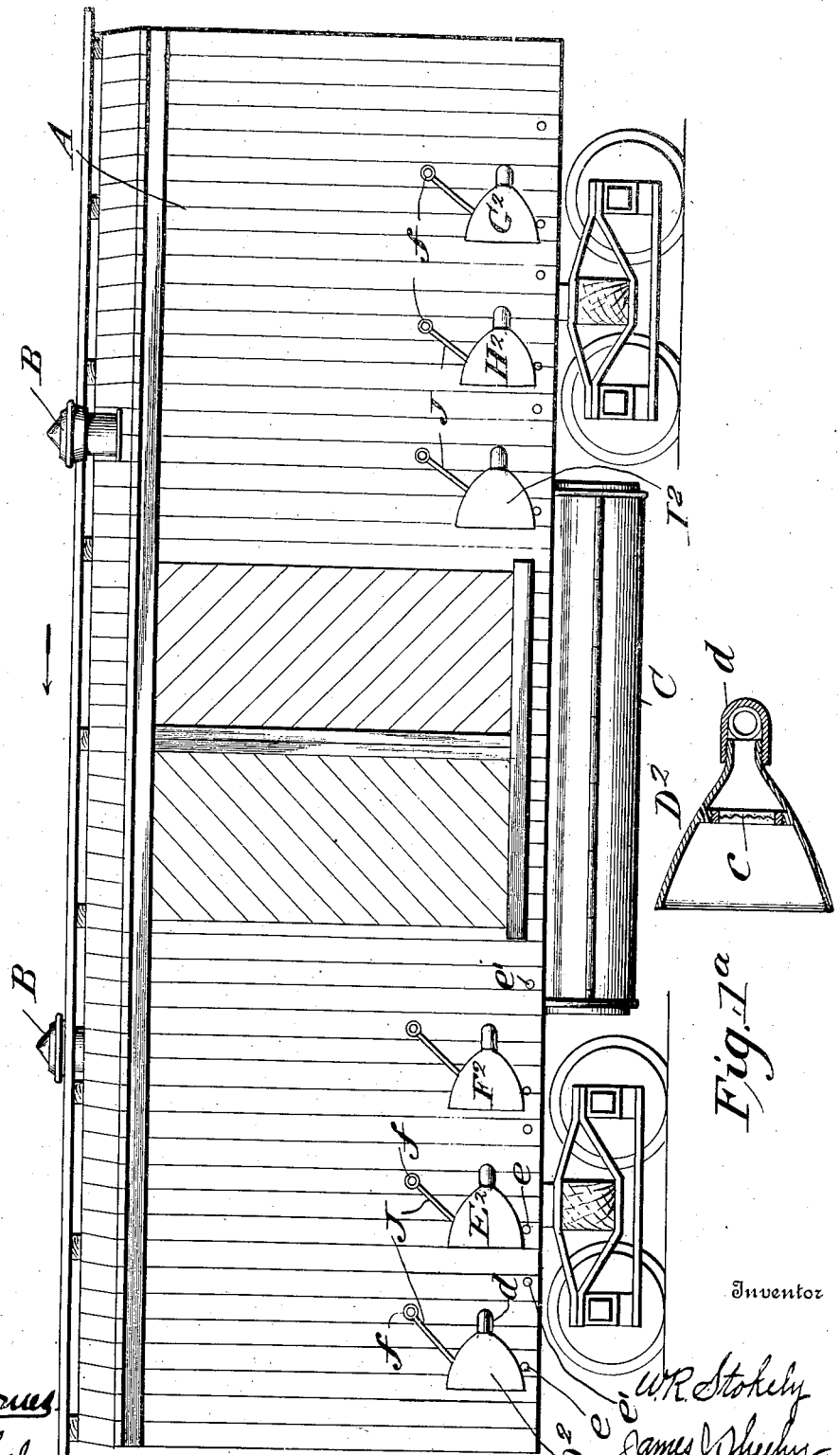

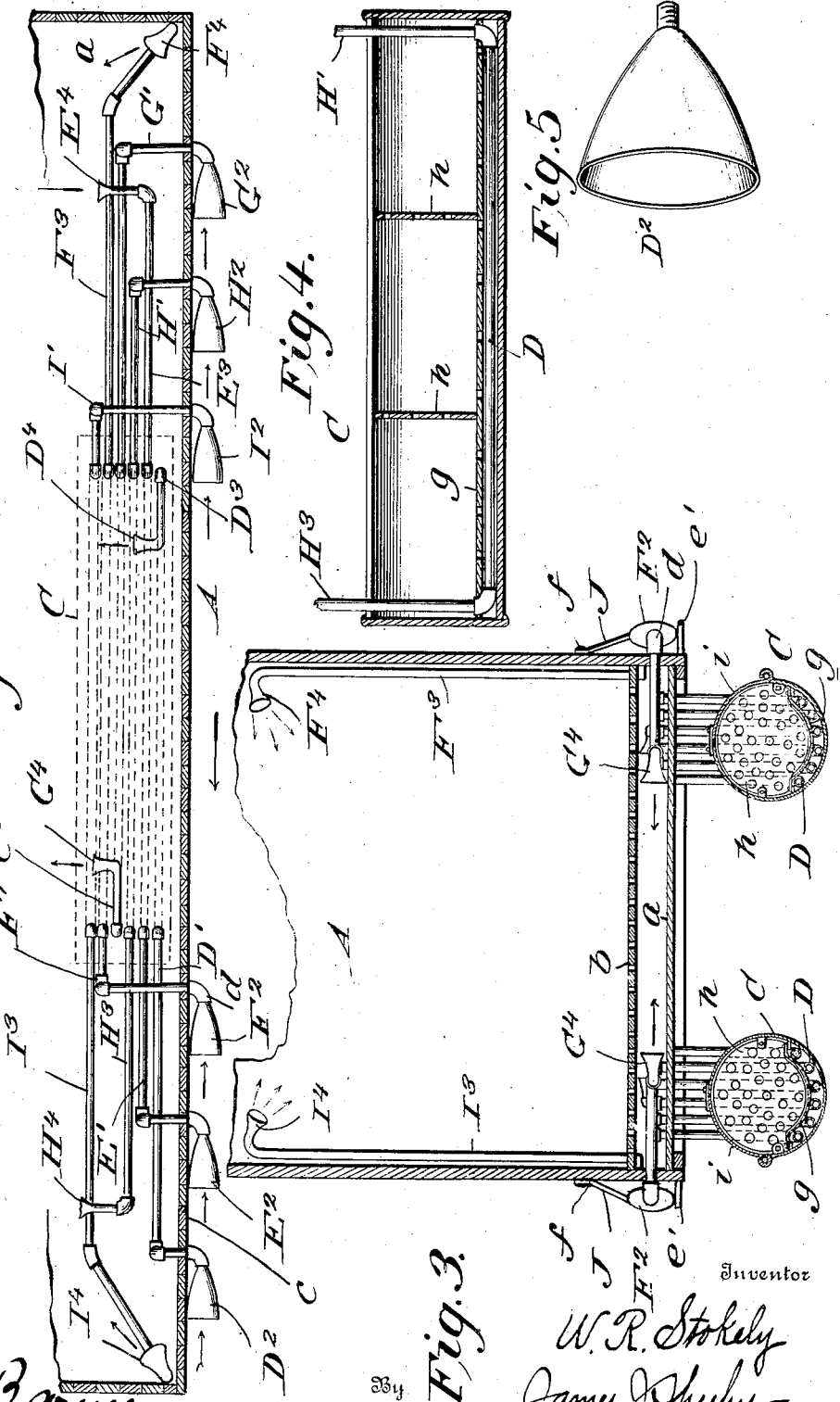

WELLS R. STOKELY, OF ST. AUGUSTINE, FLORIDA.

CAR VENTILATION.

No. 898,801.  Specification of Letters Patent.  Patented Sept. 15, 1908.

Application filed September 30, 1907. Serial No. 395,138.

*To all whom it may concern:*

Be it known that I, WELLS R. STOKELY, citizen of the United States, residing at St. Augustine, in the county of St. Johns and State of Florida, have invented new and useful Improvements in Car Ventilation, of which the following is a specification.

My invention has to do with car ventilation; and it has for one of its objects to provide a car designed more especially for the transportation of fruit with means which, without materially increasing the cost of the car or detracting from the carrying capacity thereof, is calculated to maintain at all times and under all conditions a dry and otherwise wholesome atmosphere in the interior of the car, this with a view of lessening the liability of the fruit being deteriorated while en route from one point to another.

Another object of the invention is the provision in combination with means for leading atmospheric air into the interior of a car and exhausting vitiated air from such interior, of means whereby the temperature of the air while passing from the atmosphere to the interior of the car may be tempered—i. e., cooled or heated, in order to avoid injury to the fruit being carried in either warm or cold weather.

Other objects and advantages of the invention will be fully understood from the following description and claims when the same are read in connection with the drawings, accompanying and forming part of this specification, in which:

Figure 1 is a side elevation of a car equipped with my improvements. Fig. 1ª is an enlarged vertical section of one of the inductors comprised in the said improvements. Fig. 2 is a detail horizontal section of a portion of the car taken in a plane below the foraminous false floor of the car body and above the conduits for leading atmospheric air to the interior of the car. Fig. 3 is a transverse section showing the car body and my improvements with the upper portion of the body broken away. Fig. 4 is an enlarged longitudinal, vertical section of one of the tanks comprised in my improvements, and: Fig. 5 is a perspective view of one of the inductors of the improvements, removed.

Similar letters designate corresponding parts in all of the views of the drawings, referring to which:

A is the body of a car such as generally employed for the transportation of fruit and the like. The said body A is provided with suitable means for conducting air from the interior thereof to the atmosphere, with a view of preventing the collection of damp or otherwise foul air in said interior, and in the present and preferred embodiment of my invention the said means comprises two ventilators B B arranged at opposite sides of the running board of the car and adjacent to the transverse center thereof. The said ventilators B may be of any construction compatible with the purpose of my invention, and for this reason I have deemed it unnecessary to illustrate the same in detail.

C C are tanks suitably suspended below the body A and arranged longitudinally adjacent to the sides of the body as illustrated in Figs. 1 and 3, and D D are pipes contained in and extending longitudinally of the said tanks. There are preferably six of the pipes D in each tank C, and each pipe is connected with an inductor arranged exterior of the body and a discharge mouth arranged in the interior of the body. The tanks C and their complementary systems of pipes are identical in construction, with the exception that one tank and one system of pipes are adapted for use at one side of the body A and the other tank and system of pipes are adapted for use at the other side of the body, Fig. 3, and for this reason a detailed description of the tank C and the system of pipes complementary thereto will suffice to impart a definite understanding of both tanks and the systems of pipes thereof. Referring therefore to Fig. 2, it will be seen that one of the pipes D is connected at one end to a pipe D' which extends upward through the floor proper $a$ of the body A, and thence along said floor proper $a$ and below the foraminous floor $b$ of the body, and thence laterally outward through the side wall $c$ to the body and terminates outside the body in an inductor $D^2$, and that the opposite end of the mentioned pipe D is connected to a pipe $D^3$ which reaches upward through the floor $a$ of the body and then extends along said floor and terminates in a discharge mouth $D^4$ which is preferably flared and is disposed horizontally as shown, and is located at any desired point in the area of the floor $a$. The next pipe D is connected at one end to a pipe E' which is similar to the pipe D' and terminates in an inductor E² similar to the inductor D², and at its opposite end the mentioned pipe D is connected to a pipe E³ which is similar to the pipe D³ and terminates in a discharge mouth E⁴ similar to but located at a different point from the discharge mouth E⁴. The pipe D next to the inner pipe is connected at one end to a pipe F' which is similar to the pipe D' and terminates exterior of the car in an inductor F² similar to the inductor D², and at its opposite end the mentioned pipe D is connected to the pipe F³ which extends upward through the floor $a$ of the body A and thence along the said floor $a$ to or adjacent to one of the corners of the body and then extends upward through the false floor $b$ to a point adjacent to the top of the body and there terminates in a flared discharge mouth F⁴ which is preferably directed toward the center of the car as shown in Fig. 2, and is disposed or inclined slightly downward as shown in Fig. 3. The fourth pipe D from the outside of the series is connected at one end to a pipe G' which extends upward through the floor $a$ of the body A and thence along the said floor, and thence laterally outward and terminates outside the car in an inductor G² similar to the before mentioned inductor D², and the said pipe D is connected at its opposite end to a pipe G³ which extends upward through the floor $a$ and then to a suitable point in the area of the body and is there provided with a flared discharge pipe G⁴. The third pipe D from the outside of the series is connected at one end to a pipe H' which extends upward through the floor $a$ of the body A and thence along said floor and then laterally outward and terminates outside the car in an inductor H² similar to the inductor G², and the said third pipe D is connected at its opposite end to a pipe H³ which extends upward through the floor $a$ and then to a suitable point in the area of the body and is there provided with a flared discharge mouth H⁴. The inner pipe D of the series is connected at one end to a pipe I' which extends upward through the floor $a$ of the body and thence along the said floor and then laterally outward and terminates outside the car in an inductor I² similar to the inductor H², and the said inner pipe D is connected at its opposite end to a pipe I³ which extends up and through the floor $a$ and then along the said floor to the corner at the opposite end of the car but on the same side, with reference to the corner containing the pipe F³, and then extends upward through the false floor $b$ to a point adjacent to the top of the body and there terminates in a flared discharge mouth I⁴ which is preferably directed toward the center of the car and slightly downward as illustrated.

As will be gathered from the foregoing the discharge mouths D⁴, E⁴, and F⁴ are arranged adjacent to the opposite end of the body A with reference to their respective inductors D², E² and F², and the discharge mouths G⁴, H⁴ and I⁴ are arranged at the opposite end of the body A with reference to their respective inductors G², H² and I². From this it follows that when the car is moving in the direction indicated by arrow, air will pass with considerable force and in considerable volume through the inductors, and then through the pipes D, and then through the several discharge pipes and the discharge mouths thereof into the interior of the car; some of the air being discharged under the foraminous floor $b$ and some in the corners of the body and adjacent to the top thereof. By virtue of this it will be apparent that all portions of the interior of the car will be abundantly supplied with fresh air, with the result that all of the fruit carried in the car will be preserved in a wholesome state; also, that such air will sweep before it any damp or otherwise unwholesome air that may collect in the interior of the car and force the same out through the ventilators B. It will further be understood that the air rushing out through the ventilators B will create a partial vacuum in the interior of the car, and that the air will tend to rush in through the inductors to occupy such partial vacuum, and consequently a current of fresh air will be continuously maintained through the car and the contents thereof.

As will be readily observed by comparison of Figs. 1 and 2, the inductors are considerably higher than wide, and from this it follows that the inductors are adapted to receive a large volume of air and yet do not offer any material lateral projection on the side of the car, and it will also be apparent that each inductor is provided as shown in Fig. 1ᵃ with a foraminous diaphragm $c$, designed to exclude dust and dirt, and that the pitch or sharp inclination of the lower walls of the inductors will result in the prompt discharge of any dirt or dust that may bring up against the foraminous diaphragms, and in that way lessen the liability of the latter becoming choked.

The several inductors are connected through elbows $d$ to their respective pipes, and since the elbows are adapted to turn axially on the pipes, it follows that the inductors may be swung vertically from the position shown to the reverse position, so as to adapt them for use when the car is to be moved in the direction opposite to that indicated by arrow in Figs. 1 and 2. In the position shown, the inductors are supported by lateral pins $e$, and in their reverse position the said inductors are supported by similar pins $e'$. With a view of holding the inductors against casual movement from their working positions, I provide the keepers J, Figs. 1 and 3, which are pivoted at $f$ to the body A and are arranged to be swung down and into engagement with the inductors in the manner shown in Fig. 1 and for the purpose stated. When the inductors are to be reversed, the keepers J are of course swung upward precedent to such operation.

In addition to supplying the upper portion of the car body with fresh air, the discharge mouths $F^4$ and $I^4$ serve, by directing the blasts of air downward and inward, to give rise to an agitation or whirling of the air in the car, with the result that every box of fruit in the interior of the car is permeated with fresh air. Because of this and the general circulation of air through the body A, a dry and wholesome atmosphere is maintained in the body, and consequently the fruit is kept in a dry and wholesome state for an indefinite period, which is an important desideratum.

The tanks C may be provided with any suitable means for tempering—i. e., cooling or heating the air while the same is enroute through the pipes C, and from this it follows that in warm weather the air may be cooled precedent to the supply of the same to the interior of the body A, and in cold weather the air may be heated before the same enters the interior of the body. As shown, each tank C is provided with a removable foraminous bottom g, curved in conformity to and resting close against the series of pipes, a plurality of removable transverse partitions h, and a hinged door i provided with a conventional or any other suitable fastener j for holding it in a closed position. As will be readily appreciated ice may be readily placed in the tanks when the doors i thereof are open, and it will also be appreciated that such ice will cool the air while the same is enroute through the pipes D, and that the transverse partitions h will effectually prevent the ice threshing about and moving from end to end in the tanks incident to the movements of the car and to the passage of the same up and down grades. It will also be appreciated that the foraminous bottom g will protect the pipes D against ice roughly thrown into the tanks.

When desirable pipes may be connected with the pipes D for the purpose of supplying steam or any other heating agent to the said pipes D, but these steam pipes I have deemed it unnecessary to illustrate, since I do not confine myself to the employemnt of any specific means for either heating or cooling the air during the passage of the same to the interior of the car.

The adaptability of the bottoms g and the transverse partitions h to be removed from the tanks is advantageous inasmuch as it permits of said bottom and partitions and the pipes D being repaired with facility when occasion demands.

With a view of draining the pipes D of any water that may be deposited in the same by the air passing therethrough, the said pipes may be equipped at convenient points with drain cocks, but these I have deemed it unnecessary to illustrate.

The construction herein illustrated and described constitutes the best embodiment of my invention known to me, since it assures the maintenance of dry and pure air in the interior of the car at all times, and this without detracting from the carrying capacity of the car or greatly increasing the cost of the same, but it is obvious that in the future practice of the invention such changes or modifications may be made as fairly fall within the scope of my invention as defined in the claims appended.

The arrangement of the foraminous floor b above the several pipes intermediate the pipes D and the discharge mouths is advantageous since said foraminous floor is enabled to support the fruit loaded in the car and prevent the same from injuring the said pipes.

The maintenance of thoroughly dry air in the interior of the car will be appreciated as an important advantage when it is considered that both the car and the contents thereof are kept constantly dry, and hence when the car is unloaded or discharged of fruit it may be immediately reloaded with any commodity that it is desired to transport without the necessity of waiting for the car to dry out.

Having described my invention, what I claim and desire to secure by Letters-Patent, is:

1. The combination of a car body, an inductor arranged at the outer side of one side wall of the body and connected with the interior of the body and mounted to swing vertically and in the direction of the length of the body, and stops extending laterally from said side wall of the body and arranged in a horizontal plane below that of the center of movement of the inductor and in vertical planes at opposite sides of the vertical plane of said center of movement and also arranged to limit downward movement of the inductor and to support the same.

2. The combination of a car body, an inductor arranged at the outer side of one side wall of the body and connected with the interior of the body and mounted to swing vertically and in the direction of the length of the body, stops extending laterally from said side wall of the body and arranged in a horizontal plane below that of the center of movement of the inductor and in vertical planes at opposite sides of the vertical plane of said center of movement, and also arranged to limit downward movement of the inductor and to support the same and a keeper pivoted to the said side of the body at a point above the center of movement of the inductor and arranged to swing in the direction of the length of the body and engage the inductor in the two working positions thereof.

3. The combination of a car body having a floor proper and a foraminous false floor disposed slightly above the floor proper, means for exhausting air from the upper portion of the interior of the body, inductors arranged at opposite sides of the body and in the plane of the space between the floor proper and the false floor and mounted to swing vertically and in the direction of the length of the body, stops extending laterally from the side walls of the body and arranged in a horizontal plane below that of the centers of movement of the inductors and in vertical planes at opposite sides of the vertical planes of said centers of movement and also arranged to limit downward movement of the inductors and to support the same, and a separate conduit extending directly through a side wall of the body and connecting each inductor with the space in the body between the floor proper and the false floor.

4. The combination of a car body having a floor proper and a foraminous false floor disposed slightly above the floor proper, means for exhausting air from the upper portion of the interior of the body, inductors arranged at opposite sides of the body and in the plane of the space between the floor proper and the false floor and mounted to swing vertically and in the direction of the length of the body, stops extending laterally from the side walls of the body and arranged in a horizontal plane below that of the centers of movement of the inductors and in vertical planes at opposite sides of the vertical planes of said centers of movement and also arranged to limit downward movement of the inductors and to support the same, and a separate conduit extending through a side wall of the body and connecting each inductor with the interior of the body; some of the said conduits extending directly to points below the foraminous false floor at different points in the horizontal area of the body, and the other conduits extending to and having their discharge ends arranged in the upper portion of the body at points adjacent to the corners thereof and directed toward the center of the car and slightly downward.

In testimony whereof I have hereunto set my hand in presence of two subscribing witnesses.

WELLS R. STOKELY.

Witnesses:
N. C. HEALY,
J. J. SHEEHY, Jr.